US006708252B2

(12) United States Patent
Yamamoto et al.

(10) Patent No.: US 6,708,252 B2
(45) Date of Patent: *Mar. 16, 2004

(54) APPARATUS AND METHOD FOR REALLOCATING LOGICAL TO PHYSICAL DISK DEVICES USING A STORAGE CONTROLLER, WITH ACCESS FREQUENCY AND SEQUENTIAL ACCESS RATIO CALCULATIONS AND DISPLAY

(75) Inventors: Yasutomo Yamamoto, Sagamihara (JP); Akira Yamamoto, Sagamihara (JP); Takao Satoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/112,865

(22) Filed: Apr. 2, 2002

(65) Prior Publication Data

US 2002/0099908 A1 Jul. 25, 2002

Related U.S. Application Data

(63) Continuation of application No. 09/335,175, filed on Jun. 17, 1999, now Pat. No. 6,446,161, which is a continuation of application No. 08/833,347, filed on Apr. 4, 1997, now Pat. No. 5,956,750.

(30) Foreign Application Priority Data

Apr. 8, 1996 (JP) .......................................... 08-085370

(51) Int. Cl.[7] .............................................. G06F 12/00
(52) U.S. Cl. ......................... 711/114; 711/165; 711/167
(58) Field of Search ................................ 711/114, 112, 711/165, 167

(56) References Cited

U.S. PATENT DOCUMENTS

| 5,131,087 A | 7/1992 | Warr ........................... 713/113 |
| 5,257,352 A | 10/1993 | Yamamoto et al. .......... 711/136 |
| 5,333,315 A | 7/1994 | Saether et al. ................. 707/1 |

(List continued on next page.)

FOREIGN PATENT DOCUMENTS

| EP | 07073090 | 3/1995 |
| EP | 639811 | 2/1999 |
| EP | 683453 | 12/2001 |

(List continued on next page.)

OTHER PUBLICATIONS

D.A. Patterson, et al, A Case for Redundant Arrays of Inexpensive Disks (RAID), ACM SIGMOD Conference, Chicago, IL, (Jun. 1988), pp. 109–116.
Performance Evaluation of Hot Mirrored Disk Arrays on Disk Failure, Technical Report of IEICE, CPSY95–82, DE95–68 (Dec. 1995), vol. 95—No. 407, by K. Mogi, et al pp. 19–24.

*Primary Examiner*—Reginald G. Bragdon
(74) *Attorney, Agent, or Firm*—Antonelli, Terry, Stout & Kraus, LLP

(57) ABSTRACT

A storage controller calculates an access frequency of each logical disk; selects a first logical disk device of which an access frequency exceeds a first predetermined value, the first logical disk device being allocated to a first physical disk device; selects a second logical disk device which has the access frequency equal to or less than a second predetermined value, the second logical disk device being allocated to a second physical disk device; and reallocates the first and second logical devices to the second and the first physical disk devices, respectively.

5 Claims, 8 Drawing Sheets

U.S. PATENT DOCUMENTS

| | | | |
|---|---|---|---|
| 5,392,244 A | | 2/1995 | Jacobson et al. ............ 711/114 |
| 5,404,500 A | | 4/1995 | Legvold et al. ................. 714/6 |
| 5,437,022 A | | 7/1995 | Beardsley et al. .............. 714/6 |
| 5,511,177 A | | 4/1996 | Kagimasa et al. ........... 711/114 |
| 5,537,588 A | | 7/1996 | Engelmann et al. ........ 707/202 |
| 5,546,557 A | * | 8/1996 | Allen et al. .................. 711/111 |
| 5,579,474 A | | 11/1996 | Kakuta et al. .................. 714/6 |
| 5,584,018 A | | 12/1996 | Kamiyama ................... 711/165 |
| 5,600,783 A | | 2/1997 | Kakuta et al. .................. 714/6 |
| 5,613,088 A | | 3/1997 | Achiwa et al. .............. 711/155 |
| 5,617,425 A | | 4/1997 | Anderson .................... 714/710 |
| 5,619,690 A | | 4/1997 | Matsumani et al. ........ 707/200 |
| 5,729,761 A | | 3/1998 | Murata et al. ................. 710/14 |
| 5,734,812 A | | 3/1998 | Yamamoto et al. ............ 714/6 |
| 5,737,743 A | | 4/1998 | Ooe et al. .................... 711/112 |
| 5,774,642 A | | 6/1998 | Flon et al. ..................... 714/13 |
| 5,790,773 A | * | 8/1998 | DeKoning et al. .............. 714/6 |
| 5,905,995 A | * | 5/1999 | Tabuchi et al. ............. 711/114 |

FOREIGN PATENT DOCUMENTS

| | | |
|---|---|---|
| JP | 55157053 | 12/1980 |
| JP | 59135563 | 8/1984 |
| JP | 60114947 | 6/1985 |
| JP | 6267629 | 3/1987 |
| JP | 237418 | 2/1990 |
| JP | 337746 | 2/1991 |
| JP | 3102418 | 4/1991 |
| JP | 4302020 | 10/1992 |
| JP | 546324 | 3/1993 |
| JP | 5189314 | 7/1993 |
| JP | 744326 | 2/1995 |
| JP | 784732 | 3/1995 |
| JP | 7141121 | 6/1995 |
| JP | 7146757 | 6/1995 |
| JP | 7230362 | 8/1995 |
| JP | 7306844 | 11/1995 |
| JP | 863298 | 3/1996 |

* cited by examiner

LOGICAL DISK INFORMATION
400

- STATE OF LOGICAL DISK — 401
- REALLOCATION POINTER — 402

INFORMATION OF DATA ACCESSING
500

- ACCESS FREQUENCY INFORMATION — 501
- ACCESS PATTERN INFORMATION — 502

APPARATUS AND METHOD FOR REALLOCATING LOGICAL TO PHYSICAL DISK DEVICES USING A STORAGE CONTROLLER, WITH ACCESS FREQUENCY AND SEQUENTIAL ACCESS RATIO CALCULATIONS AND DISPLAY

CROSS-REFERENCE TO RELATED APPLICATION

The present application is a continuation of application Ser. No. 09/335,175, filed Jun. 17, 1999, now U.S. Pat. No. 6,446,161; which is a continuation of application Ser. No. 08/833,347, filed Apr. 4, 1997, now U.S. Pat. No. 5,956,750.

This application relates to a U.S. patent application Ser. No. 08/824,308, filed Mar. 27, 1997, now abandoned, entitled "STORAGE SYSTEM" by Akira YAMAMOTO et al., and assigned to the present assignee, based on Japanese Patent Application No. 8-72934, disclosure of which is incorporated herein by reference.

BACKGROUND OF THE INVENTION

The present invention relates to a method of, and an apparatus for, reallocating logical disk devices to physical disk devices using a storage controller, and in particular, to a method of, and an apparatus for, reallocating logical disk devices to physical disk devices using a storage controller for improving data access performance.

A technology related to data arrangement on a disk array has been disclosed in pages 109 to 116 of an article "A Case For Redundant Arrays Of Inexpensive Disks (RAID)" reported by D. Patterson, G. Gibson, and Randy H. Katz in ACM SIGMOD conference held at the University of Illinois, Chicago in June 1988. In this article, the disk arrays are classified into five levels including RAID1 to RAID5.

In a disk array of RAID1, write data from a data processor unit is written in a main disk device and a copy thereof is stored in a sub-disk device called a mirror, thereby guaranteeing reliability of data in RAID1. In RAID1, since check information is a copy of the original data, only a small overhead is required to generate the check information and hence a desirable access performance can be obtained. However, the usage efficiency of physical storage devices is reduced to, for example, 50%.

Additionally, in the disk array of RAID5, check information called parity is produced for a plurality of write data items from the data processor unit. In RAID5, in a parity creation to generate a new parity item, it is necessary to read data and parity respectively generated before an update operation. Therefore, lengthy overhead is required for the generation of check information and hence the access performance is reduced. However, only one parity item is created for a plurality of data items, the usage efficiency of storage devices is higher when compared with that of storage devices of RAID1.

Furthermore, in JP-A-7-84732 (U.S. Priority 109,137 (Aug. 19, 1993), there has been disclosed a method in which disk devices are subdivided into RAID1 and RAID5 areas such that data is moved between RAID1 and RAID5 according to a performance protocol.

Moreover, in a report "Performance Evaluation Of Hot Mirrored Disk Arrays On Disk Failure" written by K. Mogi and M. Kitsuregawa in pages 19 to 24 of the Technical Report of IEICE, CPSY95-82, DE95-68 (1995-12), Vol. 95-No. 407, there has been disclosed a technology in which a RAID level of data is dynamically changed according to an access frequency. Specifically, disk devices are subdivided into RAID1 and RAID5 areas such that data for which write access is requested is preferentially stored in the RAID1 area. With this provision, data having a high access frequency can be stored in the RAID1 area and data having a low access frequency can be stored in the RAID5 area.

As a result of, this technology, physical disk devices having mutually different values of storage capacity and physical disk devices having mutually different RAID levels can be installed in a mixed fashion in the storage subsystem. Furthermore, data in a logical disk device can be stored in arbitrary logical disk devices according to indices such as the access frequency and pattern thereof. In addition, when storing data having a high access frequency, it may also be possible to alter the storage position thereof so that the data is written in a physical disk device having a higher speed.

According to the above, the data storage position is varied in the unit of data to be accessed. Therefore, successive data items in a logical disk device which is directly accessed by the data processing unit are discontinuous in physical disk devices in which the data items are actually stored.

On the other hand, according to the report "DE95-68" above, each time a write request is issued, data regarded to have a low access frequency is moved from the RAID1 area the RAID5 area so as to write the data in an available area thus reserved in the RAID1. Consequently, when the access frequency is low for an access pattern in a random access operation, most of data items moved to the RAID1 area are returned again to the RAID5 area.

SUMMARY OF THE INVENTION

It is therefore a first object of the present invention to reallocate logical disk devices having a high access frequency to physical disk devices having a higher speed.

According to a first aspect of the present invention, each of a plurality of logical disk devices are consecutively arranged in the plural physical disk devices. Next, the access frequency is calculated for each logical disk device. Thereafter, according to results of the calculation, there 'is selected a first logical disk device of which the access frequency exceeds a first predetermined value, the first logical disk device being allocated to a first physical disk device. There is further selected a second logical disk' which is allocated to a second physical disk device which has an operation speed higher than that of the first physical disk device and which has the access frequency equal to or less than a second predetermined value. The first and second logical disk devices are allocated to the second and first physical disk devices, respectively.

Moreover, a second object of the present invention is to reallocate logical disk devices having a high sequential access ratio to physical disk devices having a higher performance of sequential access.

According to the second aspect of the present invention, each of the plural logical disk devices are successively arranged in the plural physical disk devices. Subsequently, the ratio of sequential access is calculated for each logical disk device. Thereafter, according to results of the calculation, there is selected a first logical disk of which the sequential access ratio exceeds a first predetermined value, the first logical disk device being allocated to a first physical disk device. Furthermore, there is selected a second logical disk device which is allocated to a second physical disk device capable of achieving a sequential access at a speed higher than that of the first physical disk device and which has a sequential access ratio equal to or less than a second predetermined value. The contents of the first physical disk device are then exchanged with those of the second physical disk device to thereby reallocate the first and second logical disk devices to the second and first physical disk devices, respectively.

BRIEF DESCRIPTION OF THE DRAWINGS

These and other objects and advantages of the present invention will become apparent with reference to the following description and accompanying drawings wherein.

DESCRIPTION OF THE PREFERRED EMBODIMENTS

First Embodiment

In the first embodiment, information of data accessing of each logical disk device is collected by the storage controller such that the information is notified via the service processor (SVP) to the serviceperson. According to the information, the serviceperson issues a reallocation indication, which causes the logical disk devices to be reallocated to the physical disk devices.

Figure 1:
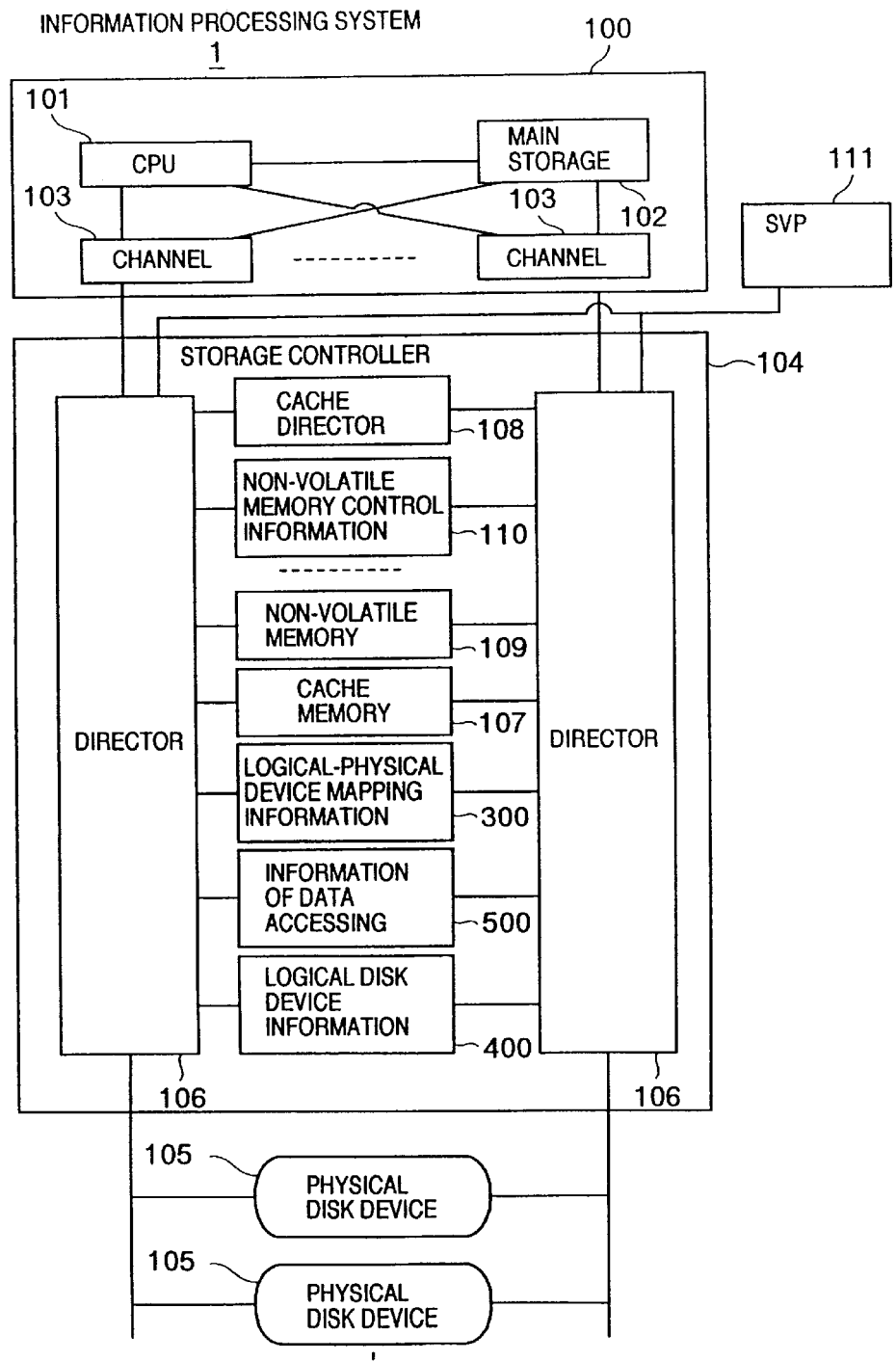
FIG. 1 is a block diagram of an information processing system including a storage controller related to a first embodiment of the present invention.

FIG. 1 is a block diagram of an information processing system including the storage controller in a first embodiment of the present invention. The information processing system 1 includes a data processor unit 100, a storage controller 104, at least one physical disk device 105, and a service processor SVP 111 which are connected to each other.

The data processor unit 100 includes a, central processing unit (CPU) 101, a main storage 102, and channels 103.

The storage controller 104 includes at least one director 106, a cache memory 107, a directory 108, a non-volatile memory 109, non-volatile memory control information 110, logical-physical device mapping information 300, logical disk device information 400, and information of data accessing 500.

The director 106 conducts transfers of data between the channels 103 of the data processor unit 100 and the physical disk devices 105, between the channels 103 of the data processor unit 100 and the cache memory 107, and the cache memory 107 and the physical disk devices 105.

Loaded in the cache memory 107 is data having a high access frequency in the physical disk devices 105. The load process is executed by the director 106. The data to be loaded therein specifically includes access objective data to be accessed by the CPU 101 of the data processor unit 100 and data in the neighborhood of the access objective data in the physical disk devices 105.

The directory 108 stores therein information for controlling the cache memory 107.

Like the cache memory 107, the non-volatile memory 109 stores therein data having a high access frequency in the physical disk devices 105.

The non-volatile memory control information 110 is used to store therein information for controlling the non-volatile memory 109.

The logical-physical device mapping information 300 is information indicating positions of the respective logical disks (200 in FIG. 2 which will be described later) allocated to the physical disk devices 105 and the logical disk devices (200 in FIG. 2) located in the respective physical disk devices. Utilizing the information, a storage area in the physical disk devices 105 is calculated for access objective data of the CPU 101 of data processor unit 100. The logical disk device information 400 indicates states such as accessibility or non-accessibility of each logical disk device (200 in FIG. 2). The logical-physical device mapping information 300 and logical disk information 400 are recorded on a non-volatile media so that the information items are kept retained therein, for example, even when the power source is interrupted.

Figure 2:
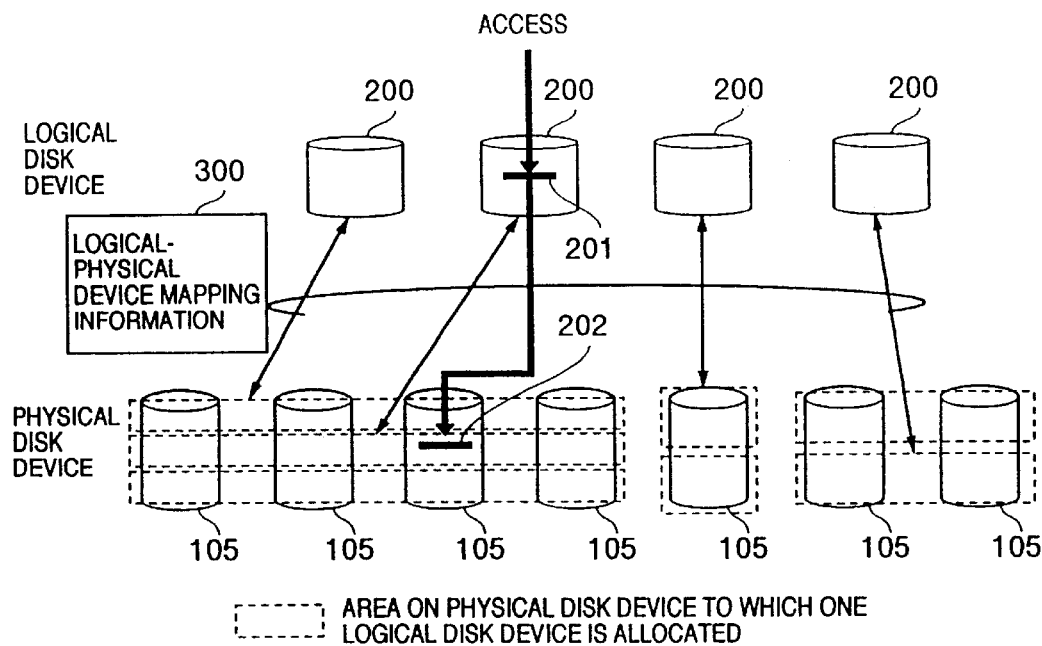
FIG. 2 is an explanatory diagram showing a correspondence relationship between logical and physical disk devices.

The information of data accessing 500 stores information such as an access frequency and an access pattern for each logical disk device (200 in FIG. 2). Each of the physical disk devices 105 includes a media on which data is recorded and a device for reading or writing the record data from or on the media.

The SVP 111 presents the information of data accessing 500 to the serviceperson and receives an input of indication for reallocation from the serviceperson. Moreover, the SVP 111 transmits an indication from the serviceperson to the information processing system 1 as well as notifies a state of defect or the like of the information processing system 1 to the serviceperson.

FIG. 2 is a diagram showing a relationship between the logical disk devices 200 and the physical disk devices 105.

The logical disk devices 200 are virtual disk devices to be directly accessed by the CPU 101 and are associated with the physical disk devices 105 in which access objective data is actually stored. Data is consecutively arranged in the physical disk devices 105 in consideration of the sequential access. When the physical disk devices 105 to which the data of the data processor unit 100 is allocated are in a disk array configuration, the logical disk device 200 corresponds to a plurality of physical disk devices 105 as shown in FIG. 2. Moreover, when the capacity of physical disk device 105 is larger than that of the logical disk device 200 and data of a plurality of logical disk devices can be stored in one physical disk device 105, the physical disk device 105 corresponds to a plurality of logical disk devices 200. The correspondence between the physical disk devices 105 and the logical disk devices 200 is controlled by the logical-physical device mapping information 300. For example, when the CPU 101 reads data 201 from the logical disk device 200, the storage controller 104 obtains the physical disk device 105 corresponding to the logical disk device 200 according to the logical-physical device mapping information 300. Moreover the controller 104 attains a data storage position 202 in the area of the physical disk device 105 to conduct a data transfer operation.

Figure 3:
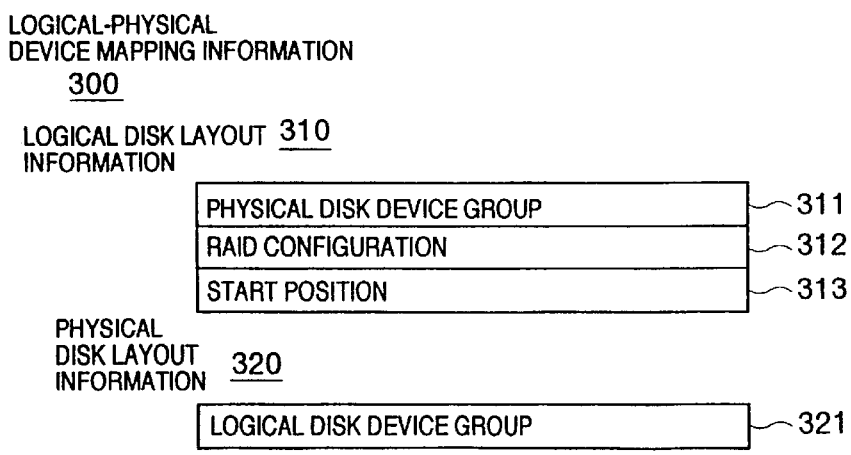
FIG. 3 is a diagram showing the layout of logical-physical device mapping information.

FIG. 3 is a diagram showing the logical-physical device mapping information 300.

The mapping information 300 includes logical disk layout information 310 and physical disk layout information 320. The logical disk layout information 310 is information related to the area in the physical disk device 105 to which each logical disk device 200 is allocated. The information 310 is adopted to obtain, according to a logical disk device 200, a physical disk device 105 corresponding thereto. On the other hand the physical disk layout information 320 includes information related to the logical disk device 105 allocated to each physical disk device 200 and is used to obtain, according to a physical disk device 105, a logical disk device 200 corresponding thereto.

The logical disk layout information 310 includes, for each of the logical disk devices 200, a set of a physical disk device group 311, a RAID configuration 312, and a start position 313. The physical disk device group 311 is information denoting a physical disk device to which the pertinent logical disk device is allocated. The RAID configuration 312 designates a RAID level of the physical disk device group 311. The start position 313 indicates the start position in the physical disk device 105 of the pertinent logical disk device 200 allocated to the physical disk device 105.

The physical disk layout information 320 includes a logical disk device group 321 for each of the physical disk devices 105. The group 321 indicates the logical disk device 200 allocated to the pertinent physical disk device 105.

Figure 4:
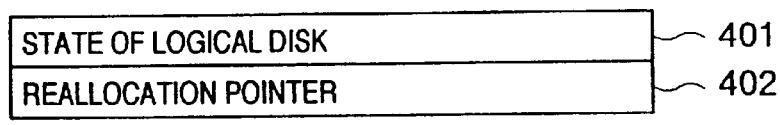
FIG. 4 is a diagram showing the layout of logical disk information.

FIG. 4 is a diagram showing the logical disk information 400.

The information 400 includes, for each of the logical disk devices 200, a logical disk state 401 and a reallocation pointer 402. The state 401 denotes the state of logical disk device 200 such as "normal" blockade", "formatting in process", or "reallocation in process". The reallocation pointer 402 is information effective only when the logical disk state 401 is "reallocation in process" and designates a position next to the area of the logical disk device already reallocated, namely, the first position of the area thereof not yet reallocated. In a data access thereto by the CPY 101 during "reallocation in process", when the access is issued to an area of which the address is smaller than that of the reallocation pointer 402, the access is made to the physical disk device 105 after the reallocation. On the other hand, when the access is issued to an area of which the address is larger than that of the reallocation pointer 402, the access is made to the physical disk device 105 before the reallocation. The access operation will be described in detail later.

Figure 5:
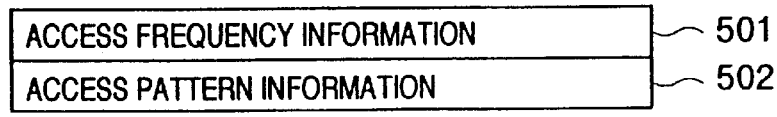
FIG. 5 is diagram showing the layout of information of data accessing.

FIG. 5 shows the access information 500.

The information 500 includes access frequency information 501 and access pattern information 502 for each of the logical disk devices 200. This information can be referred to from the data processor unit 100 as well as the SVP 111. The access frequency information 501 keeps the number of accesses to the logical disk device 200 per unit of time. This information 501 is adopted as an index to attain any logical disk device 200 having a higher or lower access frequency among the logical disk devices 200. The access pattern information 502 keeps the ratio between the sequential accesses and the random accesses to the pertinent logical disk device 200. This information 502 is employed as an index to obtain one of the logical disk devices 200 desirably reallocated to the physical disk devices 105 for which sequential accesses are frequently conducted and which has a high sequential performance.

Figure 6:
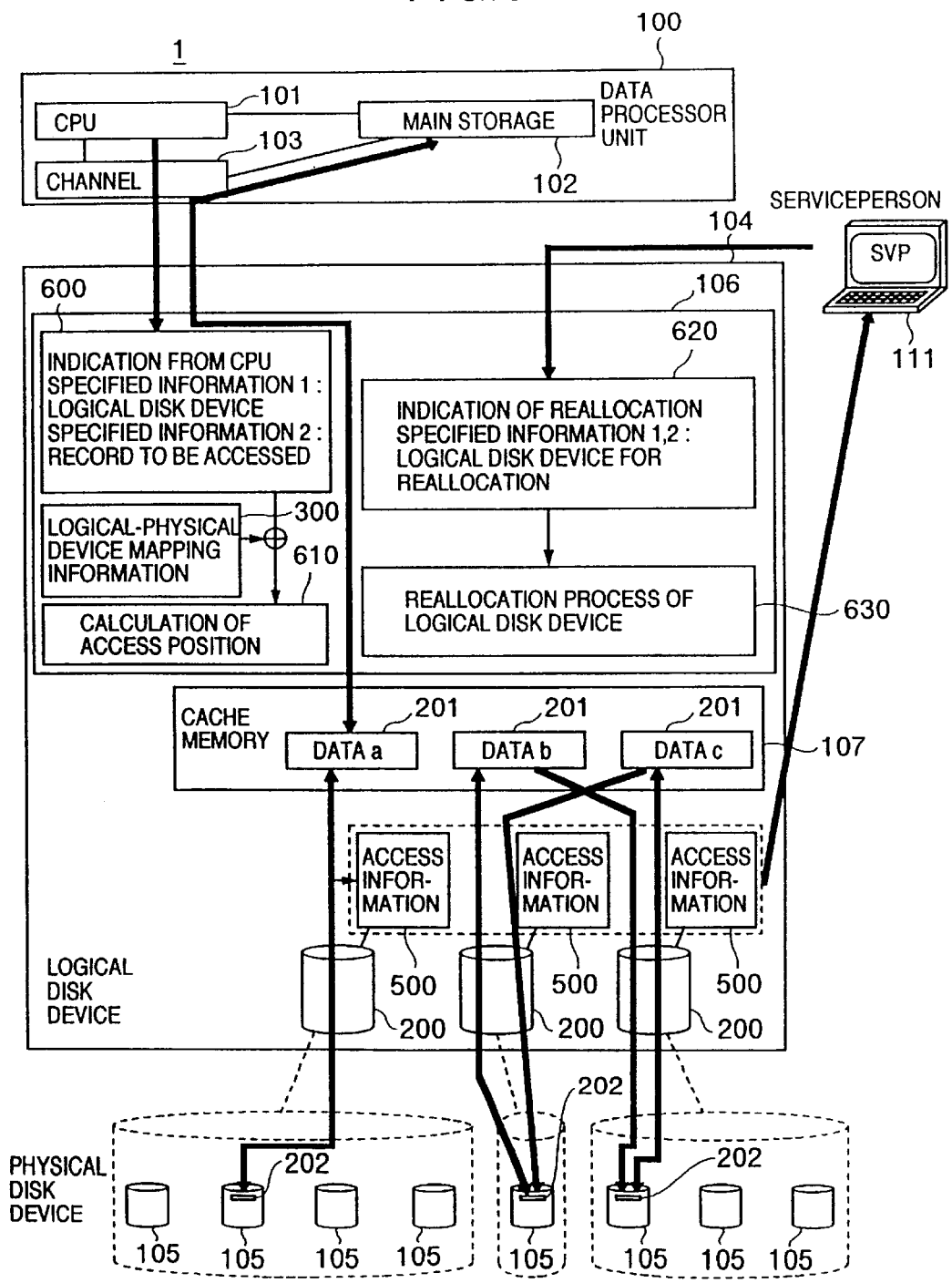
FIG. 6 is a block diagram showing operation of the storage controller in the first embodiment of the present invention.

FIG. 6 is a diagram showing in detail the operation of the storage controller 104.

First, description will be given of operation in the read and write processes by the storage controller 400.

When executing a read or write process, the director 106 ordinarily receives an indication of CPU 600 from the CPU 101 via the channel 103. The CPU indication 600 includes specifying information 1 designating a logical disk device 200 in which a record to be read (or written) is stored and specifying information 2 designating a position (track, sector, record) in the logical disk device 200 in which the record to be read (or written) is stored.

In a calculation process of access position (610), the director 106 calculates an access position in the physical disk device 105 using the indication 600 from the CPU 101 and the logical-physical device mapping information 300. The calculation process (610) will be described in detail later by referring to FIG. 8.

Thereafter, for example, in the read process, the data at the calculated data storage position 202 in the physical disk device 105 is read to be moved as data 201 in the cache memory 107. The obtained data 201 is transferred via the channel 103 to the main storage 102.

Subsequently, a process of collecting access information 500 will be described.

In the access for a read/write process by the CPU 101, the director 106 updates the access information 500 of the logical disk device 200 as the access object. The collection of access frequency information 501 is accomplished, for example, such that an internal counter increments its value for each access. After a lapse of a predetermined period of time or after a predetermined number of accesses are conducted, when an access is issued, the access frequency acquired from the internal counter is checked. The collection of access pattern information 502 is carried out, for example, such that an internal counter increments its value for each sequential accesses. After a lapse of a predetermined period of time or after a predetermined number of access are conducted, when an access is issued, the access pattern acquired from the internal counter is checked.

Next, the indication of reallocation 620 will be described. Referring to the information of data accessing 500 presented via the SVP 111, the serviceperson determines the necessity of reallocation for each logical disk device. The contents of the decision made by the serviceperson are the same as those of a decision regarding the necessity, or lack thereof of reallocation for logical disk devices (910), which will be later described in conjunction with the third embodiment by referring to FIG. 10. When there exists a logical disk device 200 decided for allocation as a result of the decision, the serviceperson issues an indication of reallocation 620 via the SVP 111 to the storage controller 104.

The indication of reallocation 620 includes information of indication 1–2 specifying two logical disk devices 200 as objects of reallocation.

Figure 7:
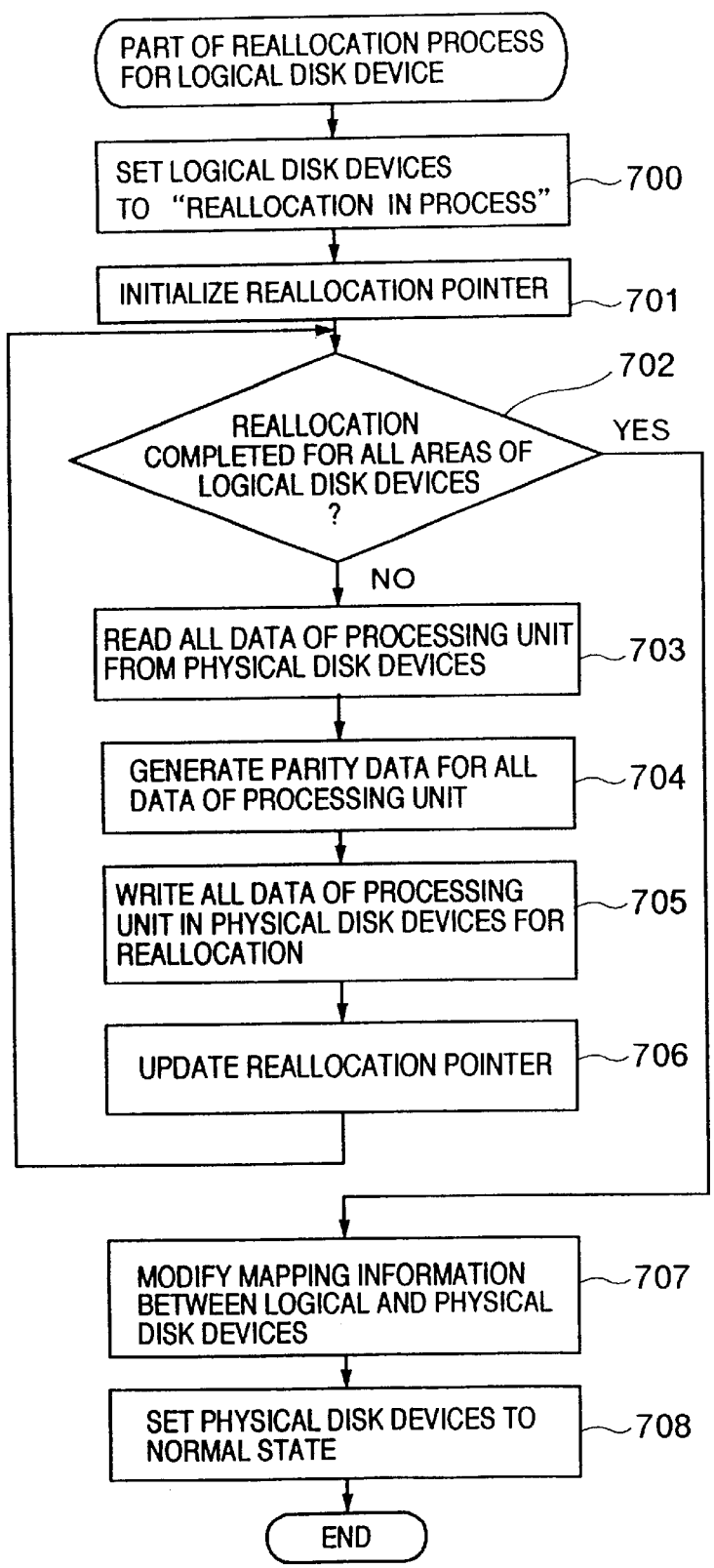
FIG. 7 is a flowchart of a process part of reallocation of a logical disk device.

Subsequently, the process of reallocation of logical disk devices (630) will be described. FIG. 7 is a process flowchart of the part of process of reallocation of logical disk devices (630). On receiving the indication of reallocation 620, the director 106 carries out the process of reallocation between the specified logical disk devices 200 (630).

First, in step 700, the state of logical disk 401 of each of the specified logical disk devices 200 is set to "reallocation in process" in the logical disk information 400.

In step 701, the reallocation pointer 402 of each of the specified logical disk devices 200 is set to the first position of each associated logical disk device 200 in the logical disk information 400.

In step 702, the reallocation pointer 402 of each of the specified logical disk devices 200 is checked in the logical disk information 400. If the reallocation has not been completed for the entire region, control is passed to step 703. If the reallocation has been completed, control is transferred to step 707.

In step 703, data of one processing unit of reallocation is transferred from the physical disk device 105 to the cache memory 107 beginning at a data position designated by the reallocation pointer 402. In this operation, the data of one processing unit of reallocation is set to the least common multiple of the respective amounts of data respectively corresponding to check information items of two logical disk devices 200 as the objects of reallocation. For example, assume that the reallocation is accomplished between a logical disk device 200 of RAID5 and a logical disk device 200 of RAID1. Since the amount of data for one check information of the disk device 200 of RAID1 is "1", the amount of data for one processing unit is equal to that of the amount of data corresponding to one check information item of the disk device 200 of RAID 5, namely, equal to that of one parity item.

In step 704, when the logical disk device 200 as the destination of reallocation is at the RAID level having parity, the parity is generated for the data 201 of one processing unit in the objective data of reallocation of the cache memory 107.

In step 705, the data 201 of one processing unit in the objective data of reallocation of the cache memory 107 and the parity produced in step 704 above are written in the physical disk device 105 as the destination of reallocation.

In step 706, the reallocation pointer 402 is advanced according to one processing unit, and then control is returned to step 702.

Incidentally, the data and parity are also transferred to the non-volatile memory 109 in steps 703 and 704 such that these items are retained even at occurrence of, a failure in the cache memory for the following reasons. Assume in the writing operation in step 705 in which, for example, data of the first and second logical disk devices 200 are to be processed. When data of the first logical disk device 200 is written in the logical disk device 105, if a failure occurs in the cache memory 107 and hence data thereof cannot be accessed, the data in the second logical disk device 200 for which the write operation is not completely achieved will be lost.

In step 707, the logical-physical mapping information 300 is updated. Namely, the logical disk layout information 310 and the physical disk layout information 321 are modified.

In step 708, the logical disk state 401 of logical disk information 400 is restored to the normal state and then the reallocation process (630) is terminated.

Figure 8:
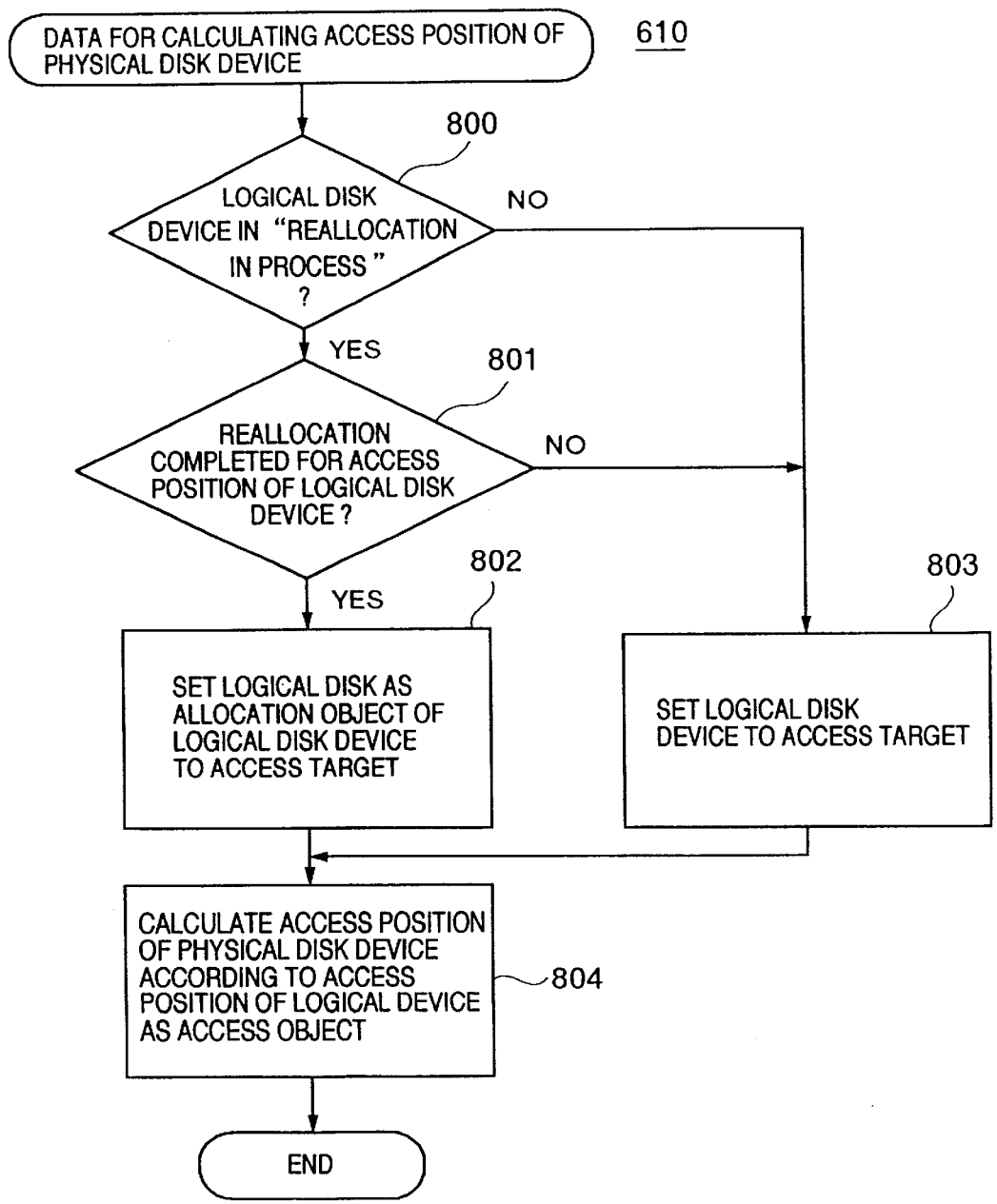
FIG. 8 is a flowchart of a process part for calculating access position of a physical disk device.

FIG. 8 is a processing flowchart of the calculation process 610.

In step 800, a check is made to determine whether or not the logical disk state 401 of the logical disk device 200 as the object of access is "reallocation in process" in the logical disk information 400. If this is the case, control is passed to step 801; otherwise, control is transferred to step 803.

In step 801, the access data position is compared with the reallocation pointer 402 of the logical disk device 200 as the object of access in the logical disk information. When the access data position is larger than the position indicated by the pointer 402, control is passed to step 802; otherwise, control is transferred to step 803.

In step 802, the logical disk device 200 as the destination of reallocation of the pertinent logical disk device 200 is set as the object of access. Thereafter, control is passed to step 804.

In step 803, the pertinent logical disk device 200 is set as the object of access.

In step 804, according to the logical-physical mapping information 300, there is calculated an access position in the physical disk device 105 corresponding to the logical disk device 200 as the object of access.

According to the information processing system 1 and the storage controller 104 related to the first embodiment, logical disk device having a high access frequency can be reallocated to physical disk devices having a higher speed according to decision of the serviceperson based on the information of data accessing 500. Additionally, logical disk devices having a high ratio of sequential access can be reallocated to physical disk devices having a higher performance of sequential access. Consequently, the access performance can be improved.

Second Embodiment

The first embodiment may be modified such that the storage controller 104 notifies that the information of data accessing 500 is presented to the data processor unit 100, which then determines the necessity or lack thereof of reallocation to issue an indication of reallocation (equivalent to the indication of reallocation 620).

Third Embodiment

In the third embodiment, the indication of reallocation is not received from the SVP 111 and the data processor unit 100. Namely, the indication of reallocation is determined by the storage controller 104.

Figure 9:
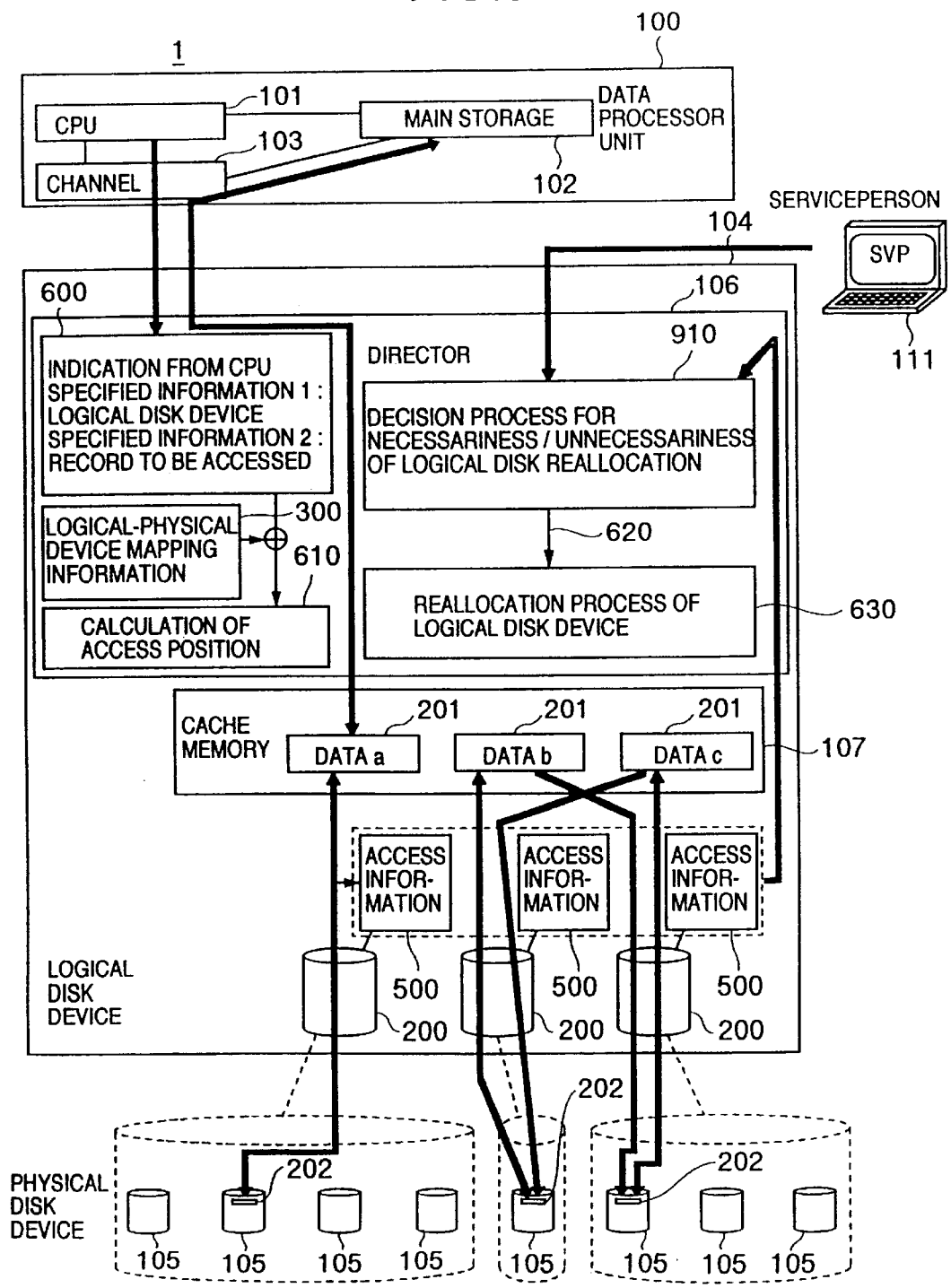
FIG. 9 is a block diagram showing operation of the storage controller in the third embodiment of the present invention.

FIG. 9 is a diagram showing in detail the operation of indication of reallocation by the storage controller 104.

This differs from the first embodiment (FIG. 6) in that the process part of determining the necessity, or lack thereof of reallocation of logical disk 910 issues the indication of reallocation 620.

Figure 10:
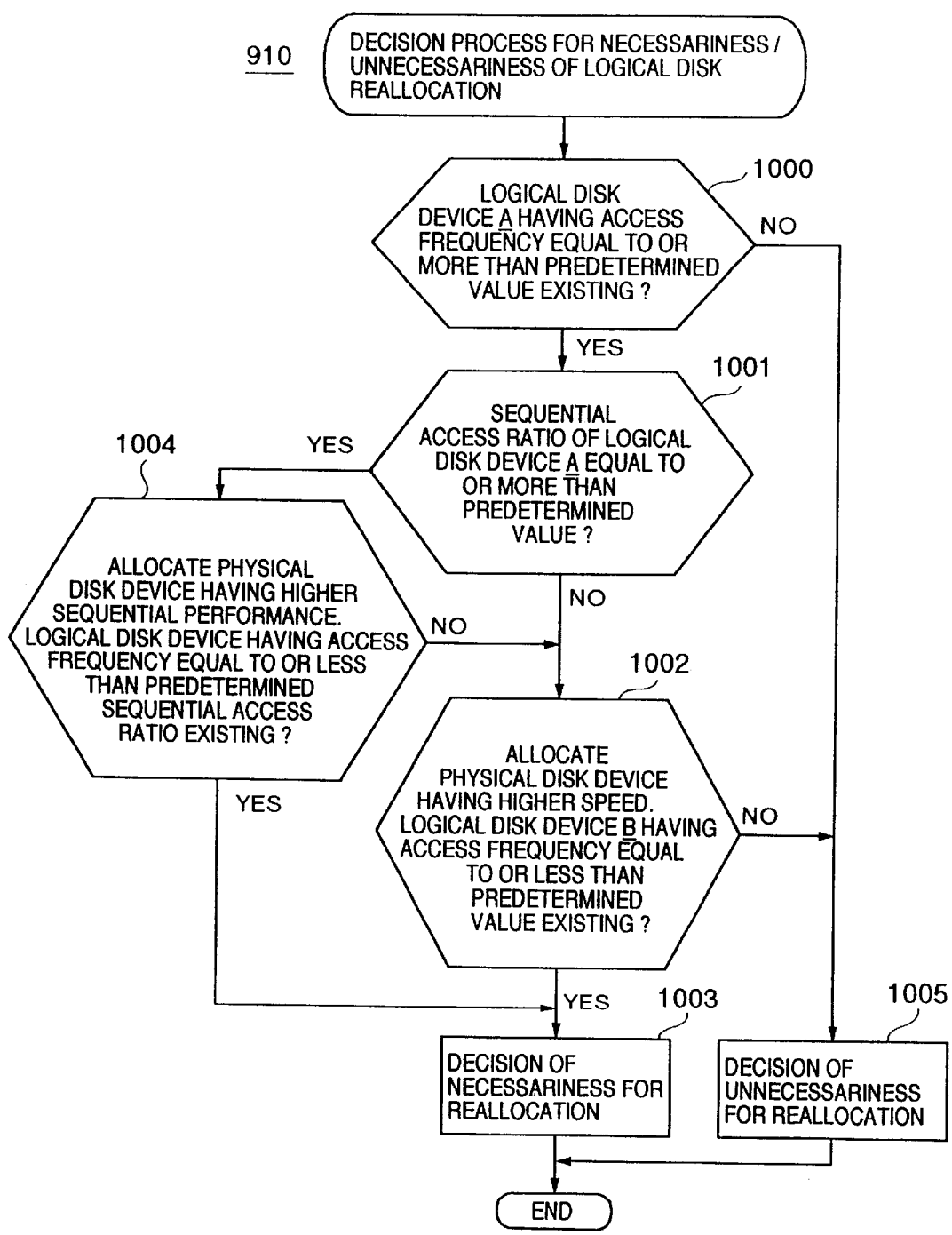
FIG. 10 is a flowchart of a process part to determine the necessity, or lack thereof, of reallocation of logical disk device.

FIG. 10 is a process flowchart of the process part 910.

This process (910) is executed by the director 106 examining the information of data accessing 500 of each logical disk device 200 at a fixed interval of time.

In step 1000, referring to the access frequency information 501 of access information 500, a check is made to decide whether or not there exists any logical disk device 200 (to be referred to as a first candidate logical disk device herebelow) for which the access frequency exceeds a predetermined value and which is allocated to a physical disk device 105 having a relatively low speed. If there exists such a logical disk device 200, control is passed to step 1001; otherwise, control is transferred to step 1005.

In step 1001, referring to the access pattern information 502 of the first candidate logical disk device 200, a check is made to decide whether or not the sequential access ratio is equal to or more than a predetermined value. If this is the case, control is passed to step 1002; otherwise, control is transferred to step 1004.

In step 1002, referring to the access frequency information 501 of a logical disk device 200 allocated to a physical disk device 105 having a speed higher than that of the first candidate logical disk device 200, a check is conducted to determine whether or not there exists a logical disk device 200 (to be referred to as a second candidate logical disk device) of which the access frequency is equal to or less than the predetermined value. If there exists such a logical disk device, control is passed to step 1003; otherwise control is transferred to step 1005.

In step 1003, it is decided that the process of reallocation (630) is required to be conducted between the first and second candidate logical disk devices 200 and the indication of reallocation 620 is issued. The processing is then terminated.

In step 1004, referring to the access pattern information 502 of the logical disk device 200 allocated to a physical disk device 105 having sequential performance higher than that of the first candidate logical disk device 200, a check is made to decide whether or not there exists a logical disk device 200 (to be referred to as a second logical disk device herebelow) having a sequential access ratio equal to or less than the predetermined value. If this is the case, control is transferred to step 1003; otherwise, control is passed to step 1002.

In step 1005, it is determined that the process of reallocation (630) is unnecessary for the logical disk devices 200. The processing is then terminated. In accordance with the information processing system 1 and the storage controller 104 related to the third embodiment, logical disk device having a high access frequency can be automatically reallocated to physical disk devices having a higher speed according to the information of data accessing 500. Additionally, logical disk devices having a high ratio of sequential access can be reallocated to physical disk devices having a higher performance of sequential access. Therefore, the access performance can be improved.

Fourth Embodiment

The first to third embodiments may be modified such that reliability required for the logical disk devices 200 is employed, in addition to or in place of the information of data accessing 500, as the index for decision of necessariness or unnecessariness of reallocation. When reliability is employed as the index, it is possible to improve the data reliability in the logical disk devices 200.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A storage controller coupled to one data processor unit and a plurality of physical disk devices, comprising:

allocation means for allocating a logical disk device, which is a virtual disk device as a target device of an access from the data processor unit, to at least one physical disk device such that the data of said logical disk device is consecutively arranged in said at least one physical disk device;

collecting means for collecting access information for the logical disk device; and reallocation means for reallocating the logical disk to at least one different physical disk device in accordance with results from said collecting means such that the data in the logical disk device is consecutively arranged in said at least one different physical disk device;

receiving means for receiving an access request from the data processor unit, said access request includes information designating said logical disk device and a location of a target record in said logical disk device; and accessing means for accessing a physical disk device corresponding to said logical disk device designated by said information.

2. A storage controller according to claim 1, further comprising:

display means for displaying the accepted access information on a service processor connected to the storage controller; and reception means for receiving a reallocation instruction from an operator through the service processor.

3. A storage controller according to claim 1, further comprising:

reception means for receiving a reallocation instruction from the data processor unit.

4. A storage controller according to claim 1, wherein said allocation means allocates the logical disk device to a plurality of first physical disk devices configuring level 1 RAID, and said reallocation means reallocates said logical disk device to a plurality of second physical disk devices configuring level 5 RAID.

5. A storage controller according to claim 1, wherein said allocation means allocates the logical disk device to a plurality of first physical disk devices configuring level 5 Redundant Array of Inexpensive Disks (RAID), and said reallocation means reallocates said logical disk device to a plurality of second physical disk devices configuring level 1 RAID.

* * * * *